United States Patent [19]

Cameron

[11] Patent Number: 4,654,205

[45] Date of Patent: Mar. 31, 1987

[54] SULPHUR TRIOXIDE ABSORPTION APPARATUS AND PROCESS

[75] Inventor: Gordon M. Cameron, North York, Canada

[73] Assignee: C-I-L Inc., North York, Canada

[21] Appl. No.: 819,124

[22] Filed: Jan. 15, 1986

[51] Int. Cl.⁴ .................. C01B 17/74; C01B 17/48; B01D 50/00; B29C 47/00

[52] U.S. Cl. .................................. 423/522; 423/533; 422/161; 422/172; 261/148

[58] Field of Search ............. 423/522, 533; 422/160, 422/161, 171, 172; 261/148, 150

[56] References Cited

U.S. PATENT DOCUMENTS

| 1,811,797 | 6/1931 | Lechler | 423/522 |
| 2,147,161 | 2/1939 | Haglund | 422/161 |
| 2,184,707 | 12/1939 | Berl | 423/523 |
| 3,944,401 | 3/1976 | Dorr et al. | 423/522 |
| 4,029,751 | 6/1977 | Dorr et al. | 423/522 |

FOREIGN PATENT DOCUMENTS

| 748218 | 9/1970 | Belgium | 423/522 |
| 2072642 | 10/1981 | United Kingdom | 423/522 |

*Primary Examiner*—Gary P. Straub
*Attorney, Agent, or Firm*—C. Brian Barlow

[57] ABSTRACT

An absorption tower for absorbing sulphur trioxide in sulphuric acid having distinct upper and lower packed absorption zones wherein substantially all of the sulphur trioxide is absorbed by the sulphuric acid in the lower zone, while in the upper zone the depleted gas stream is significantly cooled. The two zones receive feed acids of different temperatures and different acid irrigation rates. The tower allows of improved energy recovery while providing for environmentally acceptable emission standards.

4 Claims, 2 Drawing Figures

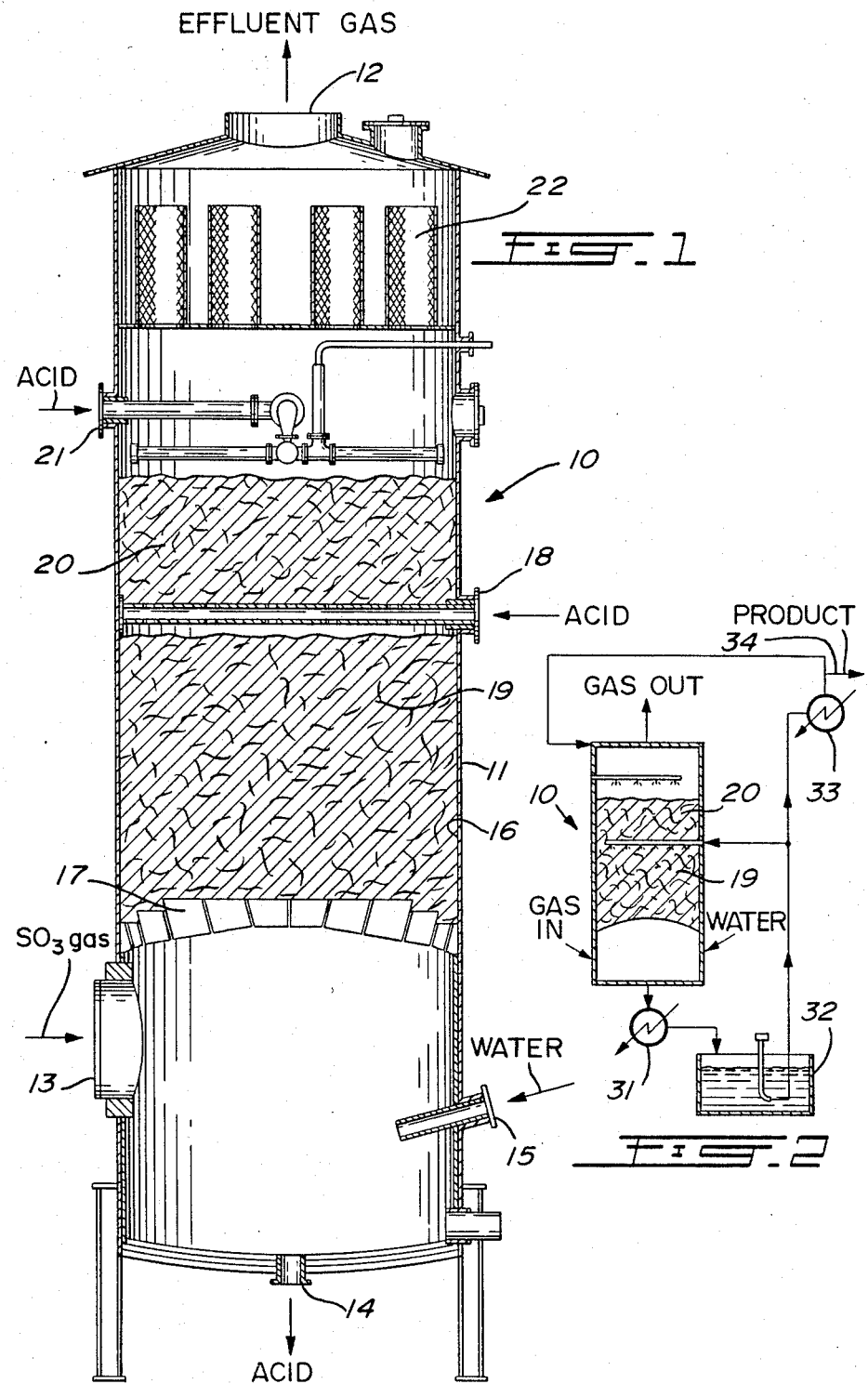

SULPHUR TRIOXIDE ABSORPTION APPARATUS AND PROCESS

This invention relates to apparatus and processes for the production of sulphuric acid from sulphur trioxide and more particularly to improved energy recovery from said processes.

In the manufacture of sulphuric acid from sulphur dioxide in the classical contact process, a dry sulphur dioxide gas is obtained which is passed through a series of catalyst beds in which essentially all of the sulphur dioxide is converted to sulphur trioxide. The sulphur trioxide is then absorbed into sulphuric acid in one or more absorption towers to provide an enriched sulphuric acid stream.

Typically, the sulphur trioxide gas stream from the catalytic converter beds contains 5-13% by volume of sulphur trioxide and is generally cooled to a temperature in the order of 160°-260° C. prior to the absorption stage. The sulphur trioxide is typically removed from the gaseous stream by countercurrent absorption with sulphuric acid within a brick lined packed absorption tower.

In consequence of the very large quantities of heat generated by the absorption of the sulphur trioxide into the acid, while having regard for the quality of the corrosion resistance of the tower materials which contact the hot gases and acid, and of the desire to avoid unabsorbed sulphur trioxide in the effluent gas stream, absorption towers require a large acid flow if overly hot, corrosive acid is to be avoided. Further, it is also desirable that broad acid concentration ranges be avoided through the use of a sufficiently large absorber acid flow. Typically, an acid product removal stream may represent only 5-10% of the circulating acid stream contained within the absorption tower packing and ancillary piping. Using materials which are economically available, acid tower outlet temperatures typically range up to 120° C., while acid inlet temperatures are in the range 70°-90° C.

There are, generally, two conflicting needs which must be satisfied in the removal of sulphur trioxide by acid absorption. There is a need for the gross removal of sulphur trioxide from the gas without exceeding the concentration and temperature limits set on the sulphuric acid used, and a second need for removing substantially all of the sulphur trioxide in the gas to efficiency levels approaching 99.9% and higher. The quantity of exothermic heat produced and removed by the sulphuric acid in the absorption towers represents the major portion of the total heat transferred within the sulphuric acid flows. Such heat is normally in an amount to allow for production of hot water at temperatures of up to 100° C. However, the temperature levels reached do not allow steam to be produced at a useful or transportable level.

In a typical double absorption sulphuric acid plant using a molten sulphur feedstock, approximately 60-65% of the heat evolved in the full sulphuric acid manufacturing process can be recovered from the various hot gas streams by direct heat transfer in the form of high quality, high pressure steam of use in many duties. The remaining heat is discharged essentially completely through the acid systems or through the stack gas exiting the plant. Generally, 25% of the total heat is transferred through the absorption of sulphur trioxide into sulphuric acid.

The quantity of heat contained in the absorption systems of a 2,000 STPD sulphuric acid plant can amount to as much as $140 \times 10^6$ BTU/hr—equivalent to 41MW in thermal terms.

Recovery of heat contained within the circulating sulphuric acid absorption system in the form of hot water suitable for heating duties is well known in the art as a sound and practical method. Such hot water recovery systems are of value in that only those acid temperatures in the typical temperature range in which most conventional absorption towers are operated are required. Such temperatures allow existing environmental emission standards to be met and conventional corrosion prevention practices to be carried out.

Typically in the art, sulphur trioxide absorption into sulphuric acid is carried out in packed brick lined towers in which acid enters the tower at temperatures in the range 75°-90° C. and leaves at temperatures in the range 100°-120° C. Acid of strength typically in the range 97.5-99% is circulated in countercurrent flow to the sulphur trioxide gas. Generally, the acid strength increases by no more than 0.5-1.0% during absorption in the single absorption tower of a single absorption plant and the primary tower of double absorption plants, and by significantly less in the final absorption towers of the double absorption plant. In both cases, the exit gas finally leaving the absorption towers is in equilibrium with the incoming absorbing acid so as to produce low levels of sulphur trioxide and sulphuric acid vapour consistent with good environmental practice.

One gas-acid contacting system commercially available for sulphur trioxide absorption uses a plurality of scrubbers instead of packing within the absorption tower. Where significant quantities of sulphur trioxide have to be absorbed, this method uses multiple venturis arranged in series in conjunction with a packed section irrigated with cooled sulphuric acid to provide the final clean-up in the absorption step. The method involves a series of co-current contacting steps in which relatively hot acid is produced as a result of the low liquid to gas ratios achievable with venturi scrubbers. However, energy recovery is still difficult in consequence of the need to cool the acid to relatively low temperatures prior to feeding the venturis.

Generation of steam of below atmospheric pressure from heat generated in a conventional absorption operation has been industrially demonstrated. In the one case known, the steam was generated at 70° C., an absolute pressure of 234 mm Hg, and was used directly upon being produced. In comparison with conventional low pressure steam at 3 atmospheres absolute, the density of the steam is less than one tenth that of standard low pressure steam and is very difficult to transport. While one available possibility is to compress the steam and then transport it, the energy required and volumes of steam to be compressed are prohibitively high.

One recently suggested process described in published European Application No. 130,967, involves the use of a "hot" absorption tower in which sulphur trioxide is absorbed in "hot" acid at a temperature in the range of 160°-200° C. The heat generated in the absorption process is removed in a heat exchanger in which water is boiled to produce low pressure steam directly. This approach depends on the use of a variety of stainless steels which satisfy specific composition formula and sulphuric acid of concentration of the order of 100%. One major disadvantage, however, is that at the disclosed temperatures there are significant vapour pressures of both sulphur trioxide and sulphuric acid associated with 99% acid, as compared with normal absorbing operations at 80° C. At 160° C., the vapour pressures of sulphur trioxide and sulphuric acid in equilibrium with 99% acid are 0.6767 and 3.994 mm Hg, respectively, while at 80° C. the values are 0.002 and 0.0425 mm Hg respectively. The vapour pressure values at 80° C. result in effluent gas emissions that conform to present environmental regulations, whereas the "hot" tower process is inadequate in terms of environmental protection and requires downstream clean-up facilities. Further, the removal and handling of gases saturated with acid and sulphur trioxide as indicated by the above data is likely to result in severe corrosion problems for most metallic surfaces. Other disadvantages of the "hot" tower system lie in the fact that absorption systems normally have, as described hereinabove, a significant concentration change in the absorbing acid as it flows through the packing, and the desired 99% + acid concentration will be difficult to maintain at both ends of the tower packing.

It is an object of the present invention to provide in a single packed tower assembly both a high level energy recovery loop and a cleaning capability to ensure of an environmentally acceptable gas discharge.

It is a further object of the invention to eliminate the need for the handling of hot, wet sulphur trioxide gas in a hot absorption operation.

Thus, the present invention provides a sulphur trioxide absorption apparatus and process wherein a single absorption tower has distinct packed upper and lower absorption zones to which distinct sulphuric acid streams are fed. Essentially complete sulphur trioxide absorption is effected using a relatively hot absorbing acid in the lower zone, while the upper zone is fed with a relatively smaller and cooler sulphuric acid stream to permit, without degradation of energy recovery from lower zone, gas cooling and effluent control. The acid streams are combined within the lower zone, cooled and, optionally, a major portion thereof recycled to the tower.

Accordingly, the invention provides a process for producing concentrated sulphuric acid from a hot gas stream containing sulphur trioxide, which process comprises:

(a) feeding said gas stream to a lower packed absorption zone contained within an absorption tower;

(b) feeding a first sulphuric acid stream to said lower absorption zone to effect absorption of a major portion of said sulphur trioxide from said gas stream into said first sulphuric acid stream to produce a first enriched sulphuric acid stream and a depleted sulphur trioxide gas stream;

(c) feeding said depleted sulphur trioxide gas stream to an upper packed absorption zone above said lower absorption zone within said tower;

(d) feeding a second sulphuric acid stream to said upper absorption zone to effect absorption of substantially all of said sulphur trioxide remaining in said depleted sulphur trioxide gas stream to produce a second enriched sulphuric acid stream and a substantially sulphur trioxide-free gas stream; said second sulphuric acid stream having an initial temperature lower than that of said first sulphuric acid stream and being fed to said upper zone in a relatively smaller amount than that of said first sulphuric acid stream fed to said lower zone;

(e) feeding said second enriched sulphuric acid stream to said lower absorption zone wherein it combines with said first enriched sulphuric acid stream to form a combined sulphuric acid stream;

(f) collecting said combined sulphuric acid stream; and (g) cooling said combined sulphuric acid stream.

The first and second sulphuric acid streams fed to the lower and upper absorption zones, respectively, may come from a direct common source, or each may emanate from a suitable and distinct acid circuit found within a full sulphuric acid manufacturing plant. For example, the acid to the upper packed absorption zone may be fed from either a drying, primary or final tower acid circuit or any combination thereof. The acid fed to the lower absorption zone may emanate from any of the above upper absorption zone acid sources or yet a further separate circuit. Preferably, the two feed acids emanate from a common source of circulating acid with the volume of the first sulphuric acid stream being greater than the volume of the second sulphuric acid stream. It is an essential feature of the process according to the invention, however, that the inlet temperature of the second sulphuric acid stream be lower than that of the first sulphuric acid stream.

Thus, in a preferred feature the invention provides a process as hereinbefore defined wherein said first sulphuric acid stream constitutes a major portion of a recycled common sulphuric acid stream and said second sulphuric acid stream constitutes a minor portion of said recycled common sulphuric acid stream.

The relative amount of acid fed to the packed absorption zones is determined by the acid inlet and outlet temperatures and concentrations desired. Under the operating conditions envisaged by this invention the acid flow requirement to the lower absorption zone will exceed that to the upper absorption zone.

Use of an overly high amount of cooler acid through the upper zone relative to the amount of hotter fresh acid fed to the lower zone will result in acid of an unsatisfactory lower temperature leaving the upper zone. The subsequent mixing of this unsatisfactory cooler acid with the hotter fresh acid within the lower zone results in a combined acid of relatively lower temperature leaving the lower zone and tower and reduced heat transfer at the significantly greater value higher temperature levels in the subsequent heat transfer step. While second enriched sulphuric acid outlet temperatures in the range 115°–120° C. and lower could be suitably employed and fall within the scope of this invention it will be appreciated that the greater the amounts of cooler acid fed to the upper zone relative to the amount of the hotter first sulphuric acid stream fed to the lower zone, the greater the detrimental effect it will have on the efficiency and value of the higher level temperature energy recovery step.

Use of a relative minimal amount of cooler acid through the upper zone would increase the relative quantity of energy transferable in the higher level temperature energy recovery step. Limitation on the temperature of the second enriched sulphuric acid stream is set by (a) the need to ensure that the acid is not corrosive to the lower zone distributor, (b) the ability of the second sulphuric acid stream to absorb the sulphur trioxide and acid vapour in the upper zone to desirable levels, and (c) the ability of the acid to cool the gas in the upper zone to the required exit temperature. Second enriched acid leaving the upper zone at temperatures below Ca 150° C. would permit the use of distributors and other equipment formed of SARAMET* austenitic steel (*Trade Mark of Chemetics International (U.S.) Inc.). Ceramic material alternatives could allow of higher acid temperatures, which fall within the scope of this invention, but such materials are not in common use in modern sulphuric acid plants.

Thus, in a further preferred feature, the invention provides a process as hereinbefore defined wherein said second sulphuric acid stream is fed to said upper absorption zone in such an amount that said second enriched sulphuric acid stream has a temperature of the same order as that of said first sulphuric acid stream.

More preferably the temperature of said second enriched sulphuric acid stream leaving said upper zone is in the range 120°-150° C.

It is also a preferred feature of the process according to the invention, however, that the inlet temperature of the second sulphuric acid stream be sufficiently lower than that of the first sulphuric acid stream such that the absorption of substantially all of said sulphur trioxide of said depleted sulphur trioxide gas stream is effected.

A feature of the present invention is thus the use of the upper absorption zone essentially as a gas cooling duty, with advantageous sulphur trioxide and acid vapour removal to acceptable levels. As a result, acid irrigation rates in this zone are low in comparison to standard sulphuric acid plant towers. The irrigation rate in the upper absorption zone is generally of an order of magnitude lower than that in the lower absorption zone. As hereinbefore described, the amount of packing and acid flow in the upper absorption zone is selected to provide a desired acid flow in order that a maximum amount of energy is absorbed into the relatively hot first sulphuric acid stream in the lower absorption zone at levels usefully recoverable commensurate with corrosion requirements and gaseous effluent control.

The somewhat enriched second enriched sulphuric acid stream is fed to the lower absorption zone wherein it is combined with the first enriched sulphuric acid to exit the lower zone as a combined sulphuric acids stream. It can be readily seen that maximum energy transfer is offered when the temperature of the second enriched sulphuric acid stream is as a minimum substantially that of the first sulphuric acid stream fed to the lower absorption zone as hereinbefore described.

In a still more preferred feature, the invention provides a process as hereinbefore defined and further comprising the step of diluting the combined enriched sulphuric acid streams with dilute sulphuric acid, or preferably water, prior to cooling said combined sulphuric acid. This dilution step allows of additional energy recovery at the most useful part of the sulphuric acid system through the recovery of heat of dilution in a single heat exchange step.

In the case where the second sulphuric acid stream is constituted in whole or in part of a minor portion of the cooled combined sulphuric acid stream this minor portion should be selectively cooled to a temperature lower than the major portion of the cooled combined sulphuric acid. The degree by which it is selectively cooled will be determined by the amount of minor portion fed to the upper absorption zone commensurate with the temperature requirement of the acid and gas exiting from the upper absorption zone according to the invention.

In a further aspect the invention provides a sulphur trioxide absorption apparatus comprising:
(a) a shell;
(b) a lower sulphur trioxide packed absorption zone within a lower part of said shell;
(c) an upper sulphur trioxide packed absorption zone above said lower absorption zone;
(d) means for feeding a first sulphuric acid stream to said lower absorption zone;
(e) means for feeding a hot gas stream containing sulphur trioxide to said lower absorption zone, wherein a depleted sulphur trioxide gas stream is produced;
(f) means for feeding said depleted sulphur trioxide gas stream to said upper absorption zone;
(g) means for feeding a second sulphuric acid stream to said upper absorption zone and then to said lower absorption zone;
(h) means for collecting hot combined sulphuric acid of said lower absorption zone;
(i) a heat exchanger for cooling said combined sulphuric acid; and
(j) means for collecting said cooled combined sulphuric acid.

In a preferred feature, the invention further comprises means for recycling a major portion of said cooled combined sulphuric acid stream to said lower absorption zone, means for recycling a minor portion of said cooled combined sulphuric acid stream to said upper absorption zone and means for selectively further cooling said minor portion of said cooled combined sulphuric acid stream.

In a more preferred feature, the invention further comprises means for diluting said hot combined sulphuric acid with water or dilute sulphuric acid prior to cooling said combined acid with said heat exchanger.

In order that the invention may be better understood, a preferred embodiment according to the invention will now be described, by way of example only, with reference to the accompanying drawings wherein:

FIG. 1 shows a vertical sectional view of a sulphur trioxide absorption tower of use in the apparatus according to and of use in the process of the invention; and FIG. 2 shows schematically an acid circulation system associated with the tower of FIG. 1.

The absorption tower 10 shown in FIG. 1 comprises a carbon steel shell 11 having an effluent gas outlet 12 at the top and a hot gas inlet 13, an acid outlet 14 and water inlet 15 at the bottom. Shell 11 at its lower and middle parts has an inner lining 16 formed of acid resistant brick and a ceramic support 17, defining the combined packing zone of the tower which is filled with ceramic packing through which gas and acid may percolate to produce a full and intimate contact therebetween.

Approximately at 60% of the height of the packing zone above the support 17 is an acid distributor 18 formed of "SARAMET" austenitic steel. The packing zone below distributor 18 constitutes a lower sulphur trioxide packed absorption zone 19 and the packing zone about distributor 18 constitutes an upper sulphur trioxide packed absorption zone 20, above which is an acid distributor 21 formed of "SARAMET" austenitic steel and an acid mist eliminator 22 formed of glass fibre contained in a stainless steel frame.

In an alternative embodiment, the ceramic packing of packed absorption zone 20 may be supported by a separate ceramic support.

FIG. 2 shows a recycled common acid circuit associated with the tower 10 wherein hot acid from the combined first and second enriched acid streams, after dilution with water within the tower, exits from the tower, is cooled by heat exchanger 31 and run off to pump tank 32. Acid from tank 32 is recirculated to the lower and upper absorption zones 19 and 20, respectively, in major and minor amounts, respectively. The minor stream is selectively further cooled by heat exchanger 33. A product take-off line 34 is suitably located between heat exchanger 33 and tower 10.

In operation, hot sulphur trioxide containing gas enters tower 10 through inlet 13 and flows upwards through ceramic packing support 17 and lower packed absorption zone 19 in countercurrent flow to a descending flow of hot concentrated sulphuric acid emanating from distributor 18. The acid is in a sufficient amount to absorb substantially all of the sulphur trioxide and is at a temperature suitable for subsequent energy recovery. At the level of distributor 18, at the top of zone 19, the sulphur trioxide and acid mist are essentially in equilibrium with the hot acid emanating from distributor 18. The depleted sulphur trioxide gas stream now passes to the upper packed absorption zone 20, wherein sufficient and cooled acid emanating from distributor 21 flows downwards to ensure that the gas is cooled to the temperature of the upper sulphuric acid stream of distributor 21. This results in environmentally acceptable levels of sulphur trioxide and acid mist.

Second sulphuric acid stream from distributor 21 is of conventional strength and at a temperature Ca. 80° C., and is supplied in an amount such that it rises in temperature through the upper zone, by heat transfer with the upcoming gas, to the temperature substantially that of the incoming acid of distributor 18 while providing adequate cooling of the gas. In the preferred absorption tower the acid through distributor 21 is of the order of 10% of the overall acid flow. The total acid flow through the lower zone 19 is sized for sulphur trioxide absorption and an acid temperature rise set by process energy recovery and materials corrosion considerations.

Acid from the two zones, 19 and 20, flows together through the lower zone to the bottom of the absorber where it is collected. In the embodiment shown this very hot combined acid is diluted with water, which further generates exothermic heat of dilution. In an alternative embodiment, dilute sulphuric acid may be the diluent. The very hot diluted acid flows to the heat exchanger 31 at a temperature sufficient to provide maximum high level energy transfer available from the acid system while providing resultant hot sulphuric acid (Ca. 140° C.). This hot acid is recycled as a major portion back to distributor 19 and, as a minor portion, selectively further cooled (Ca. 80° C.) and fed to upper zone 20 through distributor 21. Appropriate product take-off is carried out from line 34, subsequent to the further cooling step.

The preferred absorption apparatus described hereinabove represents a primary or intermediate absorber of use in and sized for a 2,000 STPD sulphur based sulphuric acid plant. The tower receives a sulphur trioxide gas stream at 170° C. obtained from the 93% conversion of a 11.5% sulphur dioxide stream.

The common recirculating acid flow of 4,000 USGPM overall enters the tower in two streams, the major one to the lower packed zone at 3,600 USGPM and temperature Ca. 140° C. and the minor one to the upper packed zone at 400 USGPM and temperature Ca. 80° C. The acid leaving the upper packed zone is at a temperature Ca. 140° and the combined very hot acid leaving the lower packed zone prior to dilution is 99.2% and at a temperature Ca. 175° C. and after dilution with water, of 98.5% strength and a temperature Ca. 180° C. The very hot combined acid is cooled to Ca. 140° C. The amount of water added to the very hot combined acid is that equivalent to the sulphur trioxide absorbed, and to the acid product take-off.

The sulphur trioxide absorption efficiency is in excess of 99.99%.

The Table, hereinbelow, sets forth the designs and operating data for the apparatus and process of the preferred embodiment (I) and, for comparison, a conventional tower (II) not designed for high energy recovery.

|  | (I) | (II) |
|---|---|---|
| Tower Diameter (I.D. Brick) | 20 ft. | 20 ft. |
| Tower Packing Depth: | | |
| Lower Zone | 7.5 ft. | 14 ft. |
| Upper Zone | 6.0 ft. | (Only 1 zone) |
| Packing Size | 3" saddles/ 1" saddles | 3" saddles |
| Gas Side Pressure Drop | 5" W.C. | 3.5" W.C. |
| Acid Flow to Distributor: | | |
| Top | 400 USGPM | 4000 USGPM |
| Bottom | 3600 USGPM | (Only 1 zone) |
| Gas Temperature From: | | |
| Bottom Zone | 140° C. | |
| Top Zone | 80° C. | 80° C. |
| Energy Removal | | |
| High Temp | 90 × 10$^6$ BTU/hr. | |
| Low Temp | 17.1 × 10$^6$ BTU/hr | 107/10$^6$ BTU/hr |

The two towers are provided with essentially identical acid pumps, tanks, lines and gas lines.

The Table shows that 84% of the heat available has been generated at elevated temperature at the expense of 1.5"W.C. which corresponds in a 2000 STPD Plant to 25–30 KW of power which is trivial by comparison with the 26,000 KW energy upgraded.

In alternative embodiments, other materials than the brick lined steel capable of withstanding the corrosion resistance service involved may be used. For example "SARAMET" austenitic steel may be used with and without anodic protection.

What I claim is:

1. In a contact process for producing concentrated sulphuric acid from dry sulphur dioxide and oxygen containing mixtures which employs the absorption of sulphur trioxide from a hot, dry gas stream containing sulphur trioxide into at least one sulphuric acid stream, the improvement comprising:
   (a) feeding said gas stream to a lower packed absorption zone contained within an absorption tower;
   (b) feeding a first sulphuric acid stream to said lower absorption zone to effect absorption of a major portion of said sulphur trioxide from said gas stream into said first sulphuric acid stream to produce a first enriched sulphuric acid stream and a depleted sulphur trioxide gas stream;
   (c) feeding said depleted sulphur trioxide gas stream to an upper packed absorption zone above said lower absorption zone within said tower;
   (d) feeding a second sulphuric acid stream to said upper absorption zone to effect absorption of substantially all of said sulphur trioxide remaining in said depleted sulphur trioxide gas stream to produce a second enriched sulphuric acid stream and a substantially sulphur trioxide-free gas stream; said second sulphuric acid stream having an initial temperature lower than that of said first sulphuric acid stream; and being fed to said upper absorption zone in such an amount as to produce said second enriched sulphuric acid stream at a temperature substantially equal to or higher than the temperature of said first sulphuric acid stream; and in a relatively smaller amount than the amount of said first sulphuric acid stream fed to said lower absorption zone;

(e) feeding said second enriched sulphuric acid stream to said lower absorption zone wherein it combines with said first enriched sulphuric acid stream to form a combined sulphuric acid stream;

(f) collecting said combined sulphuric acid stream; and (g) cooling said combined sulphuric acid stream.

2. A process as claimed in claim 1 wherein said second sulphuric acid stream is fed to said upper absorption zone in such an amount as to produce said second enriched sulphuric acid stream having a temperature selected from the range 120°–150° C.

3. A process as claimed in claim 1 or claim 2 wherein said first sulphuric acid stream constitutes a major portion of recycled said cooled combined sulphuric acid stream and said second sulphuric acid stream constitutes a minor portion of said recycled said cooled combined sulphuric acid stream, and further comprising further cooling said minor portion to a temperature lower than that of said major portion.

4. A process as claimed in claim 1 or claim 2 further comprising diluting said combined sulphuric acid stream with water or dilute sulphuric acid prior to cooling said combined sulphuric acid stream.

* * * * *

Notice of Adverse Decisions in Interference

In Interference No. 102,008, involving Patent No. 4,654,205, G. M. Cameron, SULPHUR TRIOXIDE ABSORPTION APPARATUS AND PROCESS, final judgement adverse to the patentee was rendered May 17, 1990, as to claims 1-4.

[*Official Gazette October 23, 1990*]